P. MANNY.

HARVESTER.

No. 935. Reissued Mar. 27, 1860.

THE NORRIS PETERS CO., PHOTO-LITHO., WASHINGTON, D. C.

UNITED STATES PATENT OFFICE.

PELLS MANNY, OF WADDAM'S GROVE, ILLINOIS.

IMPROVEMENT IN HARVESTERS.

Specification forming part of Letters Patent No. 16,984, dated April 7, 1857; Reissue No. 935, dated March 27, 1860.

*To all whom it may concern:*

Be it known that I, PELLS MANNY, of Waddam's Grove, in the county of Stephenson and State of Illinois, have invented a new and useful Improvement in Harvesters; and I do hereby declare that the following is a full, clear, and exact description of the same, reference being had to the accompanying drawings, forming a part of this specification, in which—

Figure 1:
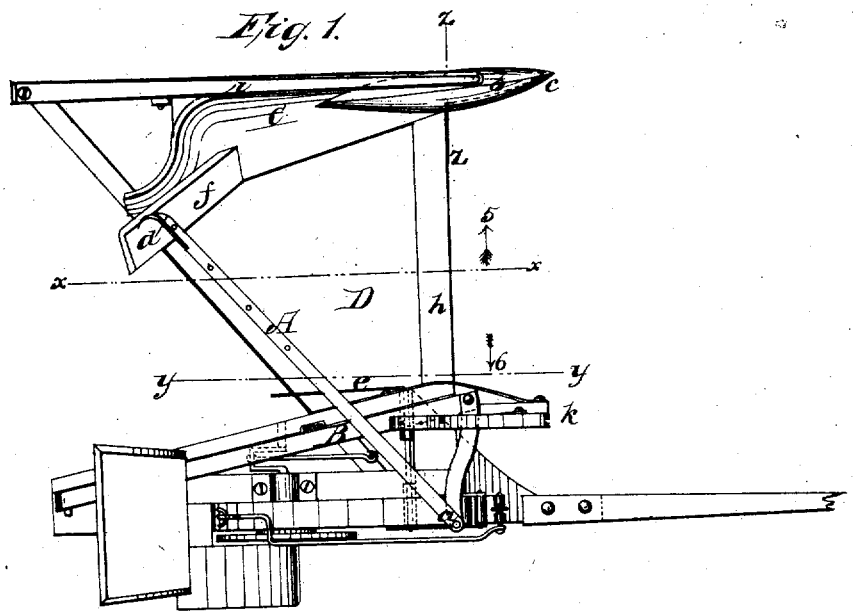
Figure 2:
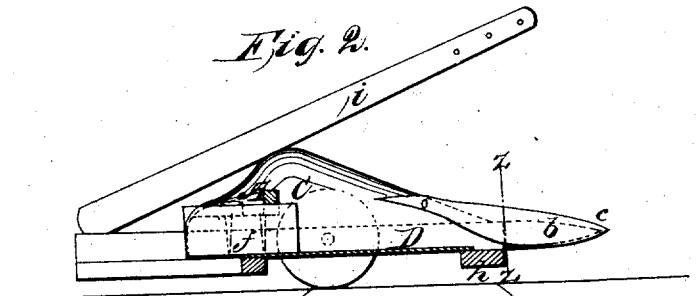
Figure 4:
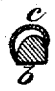
Figure 3:
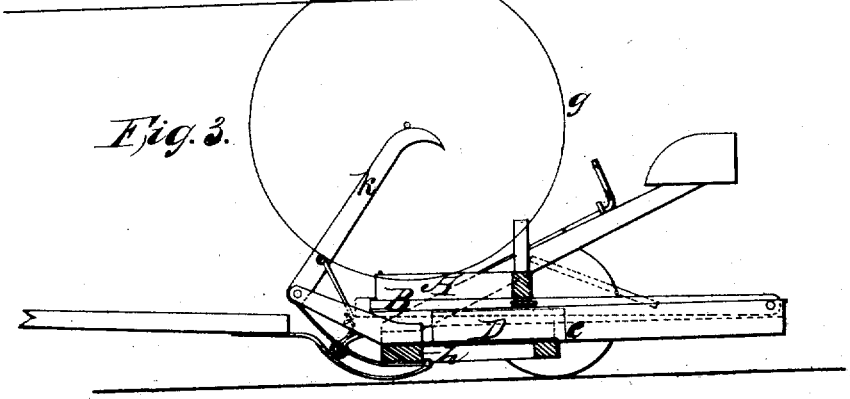

Figure 1 represents a plan or top view of the machine in part; Fig. 2, a vertical section in the line *x x*, looking in the direction of the arrow 5; Fig. 3, a similar section in the line *y y*, looking in the direction of the arrow 6. Fig. 4 is a transverse section of the divider and its sheath in the line *x' x'*.

Similar letters of reference in each of the several figures indicate corresponding parts.

My invention consists, first, in the combination, with an automatic rake, of a platform and its guards of such construction that the grain is raked, compressed into gavels, and discharged at the back end of the platform without any material change occurring in the direction of the stalks relatively to the path of the machine, while the rake changes its position in relation to the stalks during the delivery. Thus raking, gaveling, and discharging the grain without changing its slightly oblique position which it occupies when it first falls on the platform avoids that entanglement of the grain which is experienced in those machines which discharge the grain behind the driving-wheel at right angles to the position in which it is first laid on the platform, and which is due to the heads of the grain first coming in contact with the stubble when brought round in a circle to a position at right angles with the path or line of draft of the machine.

My invention consists, second, in a peculiarly-constructed elastic metallic sheath connecting the divider with the main wing of the platform, with a hook or its equivalent attached to the outer end of the rake-head, for operation together, as hereinafter described.

To enable others skilled in the art to make and use my invention, I will proceed to describe its construction and operation.

As the present improvement is connected with the operation of an automatic rake, the travel or swing of which is from front to rear of the machine in effecting the delivery of the grain from the platform, I have here represented one that has such movements, patented to me November 4, 1856; but I wish it to be understood that I do not limit the use of my invention to any particular construction of rake, but wish to extend its use to every character of rake that performs the functions herein described.

The rake represented has its head A pivoted at one of its ends, by a pin, *a*, to an up-and-down moving and supporting beam, B, which beam and rake-head are so operated that the rake sweeps across the platform back and forth in a curvilinear direction in close relationship to the platform, moving from front to back and at some distance from or above it when returning.

The pointed divider *b*, on the inner side of the machine in front, that gathers and separates the grain, which is made, say, of wood, I cover or sheath over its top and on its inner side—that is, its side next to the rake—with a thin elastic metal scroll-cap, *c*, which extends onto or against the main wing C of the harvester on its inner side, and is made of such form or configuration that a hook, *d*, on the end of the rake will in the operation of the rake sweep close and clean and over or along it, so as to clear said divider at each action of the rake of any cut grain or particles lying there, and this the smooth surface of the metallic sheath *c*, made in one piece, enables the hook *d* to effect, which a divider made of wood and in several pieces, to give it the proper form for the close action of the hook *d* over it, would not effect, as the joints of the several pieces would open by the racking of the machine and hold the grain or cut particles, while a solid wooden divider of the necessary form would be a difficult thing to make; but by employing a thin metal sheath, *c*, the same may be easily bent, when in place, to accord with the path described by the hook, the sheath lapping loose or being larger than the wood support to its interior on the platform side of it and on its top for this purpose, as represented in Fig. 4, and a perfectly smooth surface for the action of the hook *d* on and over or along it is secured without any material increase of weight. Thus is clogging or catching of the grain at this point or portion avoided, and the rake works close up to a smooth interior lining in front at its end, and will of necessity at each delivery-stroke easily remove any cut grain or particles lying there. Where a hand-rake is used this is not so important, as the raker can readily make an extra movement to remove grain lodging about the divider; but this facility is not afforded an automatic rake which has prescribed or certain positive movements, and if all lodgment be not removed at each regular stroke of the rake accumulation taking place interferes with the action of the rake, as well as that of the sickle, and duty of the divider. This smooth sheath or scroll-cap *c*, whose form accords with the traverse of the end of the rake, for operation with it, is essentially different from the heavy rigid cast-iron dividing-shoe patented to W. A. Wood on the 24th June, 1856, both as regards form and purpose for which it is intended.

The curved projecting end of the rake or hook *d*, which works in connection with the metal cap or sheath *c* of the divider, it should be observed, is of reversed-hook form, whereby it rides more readily along and over the sheath *c* without injury to or entanglement with such standing grain as may lean over its path, said hook in its return or forward stroke gently pushing said grain away to one side of it, and in the delivery-stroke of the rake said hook preventing the cut grain or particles which it gathers from off the divider or sheath *c* from being thrown outward to accumulate, and insuring the positive delivery or removal of them each back stroke of the rake, while the form of the hook generally is the best for easy and close contact with the smooth sheath or cap *c* of the divider and connecting the divider with the main wing C.

To enable the rake to work under the reel, which is represented by the circle *g* in Fig. 3, for clearance of grain or cut particles from and along the sheath *c* of the divider, as before specified, and from and off the sickle in front of the finger-bar *h* to carry off short grain which fails to reach the platform, I support the reel on the inner side of the machine on an ordinary bar, *i*, inclining upward forwardly from the back of the machine, and sustain the reel on the draft side on an arm or elbow, *k*, attached at its lower end to a projection from the main frame in advance of the space which the sickle usually occupies, and make said arm *k* to curve backwardly at its top over the play of the rake and to a point above, over, or in rear of the finger-bar, whereby the reel may be hung in its ordinary or proper operative position, and the rake be allowed its free play under the reel, along the divider, and over the sickle and finger-bar, as and for the purposes above and before specified.

To the outer or grain side of the platform, near the rear termination of the wing C, a bar *f*, is arranged so as to form an angle with or stand obliquely to the wing C and diagonally to the platform, substantially as represented. This bar serves as a partial support to the back end of the platform; but its main and important office is to deflect the grain into a tapering opening at the discharge end of the platform, said opening being formed with or inclosed laterally by the near side bar, *f*, and the off side bar or frame-piece, *s*, which latter is made of much greater length than heretofore, in order to allow the grain to be retained and compressed at the butts between it and the rake as the rake passes over the platform to discharge the gavel in a compact form. With this arrangement, as the grain is raked off the platform its heads come in contact with the bar *f* on the back end of the platform, and is deflected in its passage toward and into the tapering space R, and as the rake moves toward the completion of its backward movement the grain is compressed at the rear of the gavel between the rake and the side bar *s*, or the spring-bar *e*, if it be used, and is discharged through the tapering space R in compact form. This compressing of the grain at the discharge end of the platform is the essential feature of my invention, it preventing the drawing, scattering, and entangling of the grain experienced in some other machines from the gradual discharge of the grain from the platform, for by my invention the contents of each rake are retained until the rake has fully completed its stroke and the whole dropped at once, when the rake ascends to a position for making its return movement to the front end of the platform for another raking operation.

In the drawings a spring-bar *e* is shown arranged on the side of the bar *s*. This bar is designed to contract the V-shaped or tapering space R. The butts are held between the rake and bar *s* when the bar *e* is not used while the heads or tops of the stalks are brought around to a position in line or nearly in line with the path of the machine, when they are dropped upon the ground through the space R in a gavel as the rake rises for the next operation.

The tapering of the space R may also be reduced to a very considerable extent and the deflecting-bar *f* set vertically and increased in length without departing from the principle involved in my invention—to wit, the raking, compressing, and discharging of the grain in gavels without materially changing its slightly oblique position given to it by the divider, and which it occupies when it first falls onto the platform.

What I claim as my invention, and desire to secure by a reissue of these Letters Patent, is—

1. In an automatic raking device, the combination of the bar *f*, standing at an angle with the wings C, the bar *s*, and the rake A, arranged in relation to the taper space R in the manner and for the purpose substantially as above specified.

2. The combination of the bar *s* and the rake A, so arranged and operating that the rake, which at first moves longitudinally with the straw, shall afterward change its relation thereto and compress it laterally against the bar *s*, so as to hold it firmly in place until it is deposited at the opening R in a compact gavel, lying nearly parallel with the direction in which the machine moves, substantially as above set forth.

3. The combination of the elastic metal cap or sheath *c*, connecting the divider *b* with the main wing C, with the reversed hook or bent projecting end *d* of an automatic rake, when said parts are constructed and arranged for joint operation essentially in the manner and for the purposes set forth.

PELLS MANNY.

Witnesses:
GOODWIN Y. ATLEE,
T. F. ALLEN.